United States Patent [19]

Breisch

[11] 4,014,405

[45] Mar. 29, 1977

[54] KNOCK-DOWN SAWHORSE

[76] Inventor: John H. Breisch, 2103 Arthur Ave., Lakewood, Ohio 44107

[22] Filed: June 30, 1975

[21] Appl. No.: 591,429

[52] U.S. Cl. .................................. 182/181; 182/46; 182/224

[51] Int. Cl.² .......................................... F16M 11/00

[58] Field of Search .......... 182/181, 182, 183, 184, 182/185, 186, 224, 225, 226, 46; 256/64

[56] References Cited

UNITED STATES PATENTS

| | | | |
|---|---|---|---|
| 320,674 | 6/1885 | Murray | 182/184 |
| 978,403 | 12/1910 | Schott | 182/186 |
| 1,462,707 | 7/1923 | Lawlor | 182/181 |
| 3,456,100 | 7/1969 | Green | 256/64 |
| 3,704,849 | 12/1972 | Green | 182/181 |

*Primary Examiner*—Reinaldo P. Machado
*Attorney, Agent, or Firm*—Bosworth, Sessions & McCoy

[57] ABSTRACT

A sawhorse which is easily assembled and is portable, light and compact when knocked-down. The sawhorse has a horizontal cross beam with several vertical, rectangular, hollow recesses extending from its bottom side. At least two pairs of legs are attached to the cross beam by inserting the ends of a pair of legs into a single vertical recess. Each leg has a wedge-shaped upper end allowing the pair of legs to be wedged into engagement with the recess. The sawhorse is made from a structural foam thermoplastic material, permitting the sawhorse to be light yet capable of supporting heavy loads. In addition the plastic will not rot, splinter, warp, or rust. A vertical brace may also be added between a pair of legs to provide additional stability to the structure.

2 Claims, 9 Drawing Figures

KNOCK-DOWN SAWHORSE

BACKGROUND OF THE INVENTION

The present invention relates to sawhorses, and particularly to sawhorses which can be knocked down to a compact form for shipment and when not in use and easily assembled when needed.

Sawhorse-type structures are used in a variety of applications. In the construction industry, sawhorses are used as support devices for construction materials, and in making scaffolds by supporting a platfold on a pair of sawhorses. Similar structures are used as barricades for segmentation of specific areas such as in crowd control, and as visual warning devices such as around highway accidents or construction.

The need for a sawhorse is often a temporary one, and between uses it is convenient to knock-down the sawhorse to a more compact and portable form. A knocked-down form allows the sawhorse or barricade to be transported easily to where it is needed so that it can be assembled for use. In the past, disassembly and assembly of sawhorse-type structures was somewhat involved. The legs were usually attached to the horizontal beam by means of bolts, screws, nails or clamps. Such mounting means were necessary to provide secure attachment of the legs to the cross beam to prevent the sawhorse from falling apart when moved or used.

In addition, previous sawhorse constructions were often heavy which impeded their portability. A light sawhorse, however, was incapable of supporting heavy loads.

Prior sawhorse materials have also been subject to decomposition and deterioration when exposed to weather over a period of time. Past sawhorses have been made of wood or metal. Wood sawhorses splinter, warp, and rot, and metal sawhorses rust and corrode. Such sawhorses also require protective coatings.

SUMMARY OF THE INVENTION

The above problems are overcome by the sawhorse construction of the present invention.

It is an object of the present invention to provide an improved sawhorse which can be knocked down and easily assembled.

Another object of the present invention is to provide a sawhorse which can be assembled without the necessity of inserting bolts, screws, or other bothersome attaching means.

Another object is to provide a sawhorse which is light and compact when knocked down yet capable of supporting heavy loads when assembled.

Still another object is to provide a sawhorse which will not rot, splinter, warp, rust or corrode and which will require no protective coating.

These and other objects are accomplished according to the present invention by the provision of a sawhorse comprising a horizontal cross beam and two pairs of legs. The horizontal cross beam has at least two vertical rectangular-shaped hollow recesses extending into the interior of the beam from the bottom thereof. Each leg has a wedge-shaped upper end. The wedge-shaped ends are combined into pairs, and the upper ends of each pair of legs are removably inserted into a single hollow recess on the underside of the horizontal cross beam. The sawhorse is assembled by wedging each pair of legs into solid engagement with a recess.

To provide a solid yet light and portable construction, the sawhorse is preferably made from a structural foam thermoplastic material. Such a material is not subject to rot, warping, or rust like wood or metal and does not require a protective coating. The plastic material also allows the construction of the slots in the horizontal cross beam without structural deterioration as would occur with wood. Plastic material makes possible the wedge-shaped friction engagement of the legs which is not easily accomplished with metal.

DESCRIPTION OF THE PREFERRED EMBODIMENT

Figure 1:
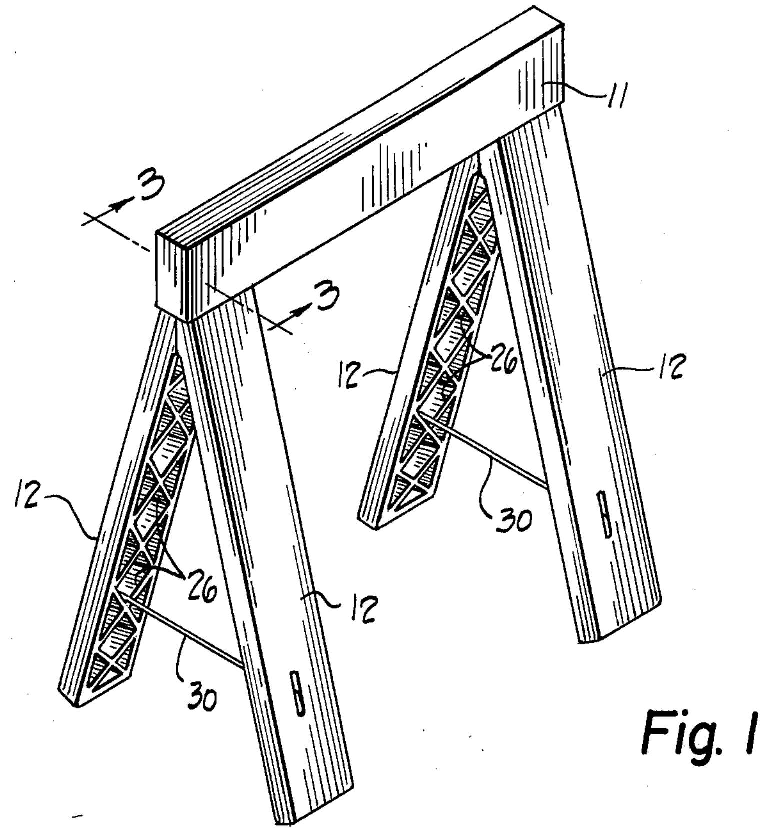
FIG. 1 is a perspective view of the sawhorse in assembled form.
Figure 2:
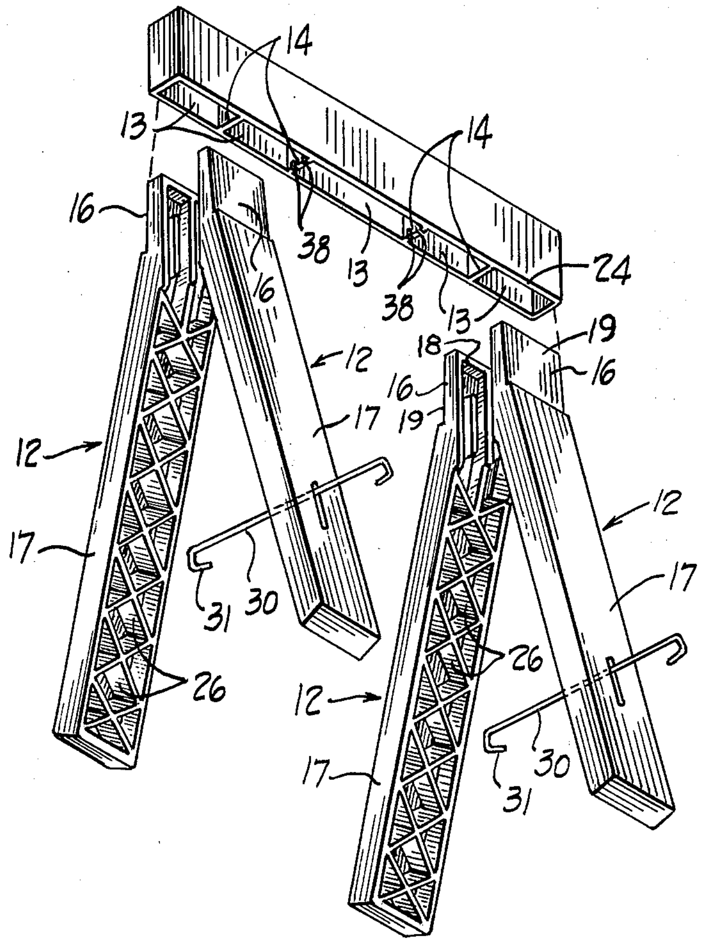
FIG. 2 is an exploded perspective view of the sawhorse from a different angle showing it dissembled.

Referring more particularly to the drawings, FIG. 1 shows the basic structure of the sawhorse of the present invention. The sawhorse has a horizontal cross beam 11 into which at least two pairs of legs 12 are inserted. As shown in FIG. 2, the cross beam 11 has a plurality of generally rectangular-shaped hollow recesses 13 which extend into the beam from the underside of the beam. Each hollow recess 13 is dimensioned to receive a pair of legs. As can be seen in FIG. 2, more than two pairs of legs can be inserted into recesses along the bottom of the cross beam 11, providing additional support for heavy loads. Also, the legs need not necessarily be inserted at the end of the beam, making possible a cantilevered beam construction which may be advantageous for certain applications.

The recesses 13 along the cross beam 11 give the cross beam a hollow interior, making the cross beam lighter and more portable than a conventional solid cross beam. The partitions 14 between the recesses 13 also act as reinforcements in the beam construction, enabling the cross beam to be strong as well as light.

The beam 11 shown in FIG. 2 has a length comprising six recesses 13. However, it is understood that cross beams can be made to any desired length. A very short cross beam may be practical for certain applications, and a long cross beam may be advantageous in other situations. If the cross beam 11 is very long, it may be necessary to insert more than two pairs of legs 12 in the recesses 13 in order to provide adequate support to the cross beam.

The legs 12 are identical. Each leg has a generally vertical wedge-shaped upper portion 16, and a lower portion 17 extending at an obtuse angle from the upper portion. The lower portion 17 may be made to any desired length depending upon the desired height of the cross beam 11. As shown particularly in FIG. 3, the upper portion 16 has a flat vertical inner side 18 and a flat angled outer side 19. The vertical side 18 is juxtaposed with the complimentary vertical side 18 of the adjacent leg to form the leg pair. The angled side 19 is not parallel to the vertical side 18 but is angled such that the upper portion 16 slopes slightly outwardly from its junction with the upper end surface 20 to the position of a ledge 22 at the juncture of the portions 16 and 17. Thus when a pair of legs 12 are combined and the vertical sides 18 are flush against each other, the upper portions 16 combine to form a wedge-shaped assembly. The width of the combined upper portions 16 measured at the upper surface 20 is less than the width measured across the upper portions 16 just above the ledges 22.

Figure 3:
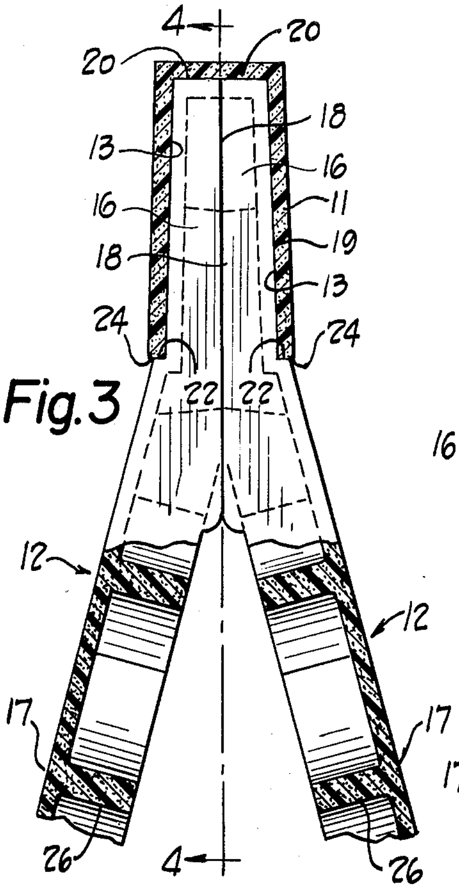
FIG. 3 is a sectional view taken along line 3—3 of FIG. 1.
Figure 4:
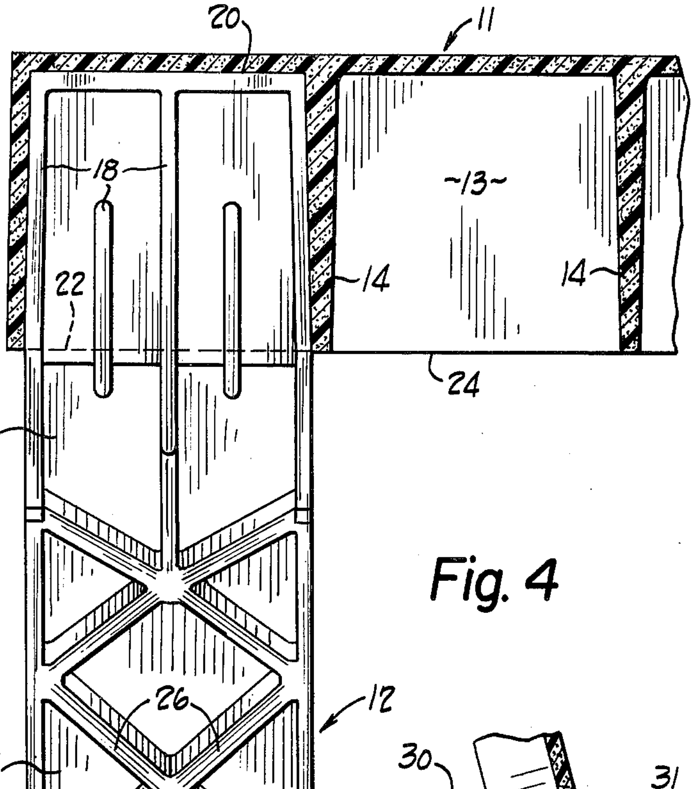
FIG. 4 is a sectional view taken along line 4—4 of FIG. 3.

To assure that the legs are securely held to the cross beam, each recess 13 in the cross beam 11 is dimensioned to firmly receive the wedge-shaped upper portions 16 of a pair of legs 12 as shown in FIG. 3. Due to the wedge shape of the leg upper portions 16, the legs fit more tightly as they are forced further into the cross beam recess 13. The tight fit assures the legs will remain in the sawhorse if the sawhorse is moved about in assembled form without the necessity of additional bolts, screws, clamps, or other external mounting means. The wedging action of the fit also provides stability to the sawhorse when it is under load. The greater the load on the sawhorse, the tighter the wedging of the assembly, and the stronger the attachment of the legs. The ledges 22 on the legs also function to support the underside 24 of the cross beam 11.

In order to reduce the weight of the sawhorse so that it can be easily transported, each leg 12 is also hollowed out. A series of reinforcements is provided throughout the hollow portion to strengthen the leg. In its preferred embodiment, these reinforcements comprise diagonal struts 26 which are integrally formed with the material of the hollow leg shell. The diagonal struts give a diamond-shaped appearance to the inner sides of the lower portions 17 of the legs. On the inner sides 18 of the upper portions 16, parallel vertical struts 28 are integrally formed with the hollow shell of the upper portion. The vertical struts 28 provide a bearing surface when the inner sides 18 are juxtaposed and the upper portions 16 are wedged in the recess 13. While the diagonal struts 26 and the parallel struts 28 are preferred, it is understood that any other form of reinforcements could be used to similar advantage.

Figure 7A:
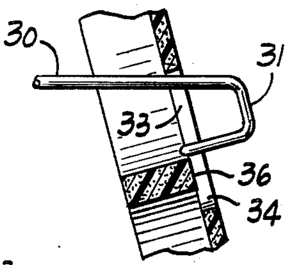
FIGS. 7*a* and 7*b* are sectional views of a portion of FIG. 6 showing the attachment of an optional brace.
Figure 5:
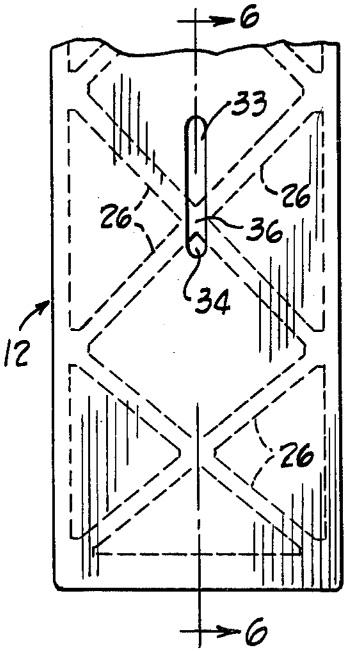
FIG. 5 is an elevational view to a larger scale of the bottom of a leg of the sawhorse.
Figure 6:
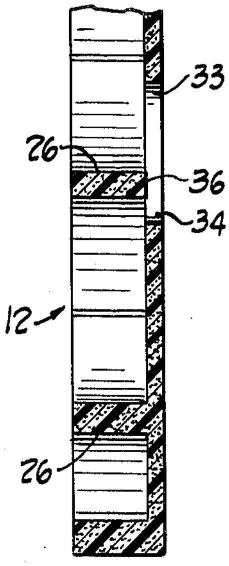
FIG. 6 is a sectional view taken along line 6—6 of FIG. 5.
Figure 7B:
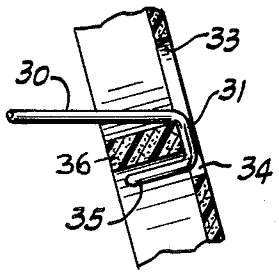

When used under extremely heavy loads, the lower portion 17 of the legs may tend to spread apart at the bottom. To reduce this tendency, cross braces 30 may be added to the sawhorse. Such braces can be easily fabricated from a metal rod formed with hooks 31 at each end. Each brace 30 can be removably attached to a leg at each end using any conventional method. The preferred method of attaching the braces 30 to the lower portions 17 of the legs 12 is shown in FIGS. 5, 6 and 7. Each lower portion 17 has a slot 33 and a hole 34 in the center of the lower portion of the leg near the bottom. As shown in FIGS. 7*a* and 7*b*, the hook 31 on the brace 30 is inserted through the slot 33 and engages a reinforcing strut 26. The end 35 of the hook is inserted into the hole 34 as shown in FIG. 7*b*. By this construction, the brace can be easily and quickly attached to the leg. The brace 30, can also be quickly detached from the leg. Upon forcing the lower portions of the legs toward each other the end 35 of the hook comes out of the hole 34. The entire hook 31 can then be removed through the slot 33.

In order to increase the strength of the sawhorse, the slot 33 and the hole 34 are preferably situated on the lower portion 17 of the leg so that the intersection of two reinforcing struts 26 is located between the slot 33 and the hole 34 as shown at 36 of FIG. 6. In the preferred construction of FIG. 5, two reinforcing struts 26 cross at location 36. This construction assures that the brace 30 is firmly attached to the reinforcing struts 26 of the leg.

Figure 8:
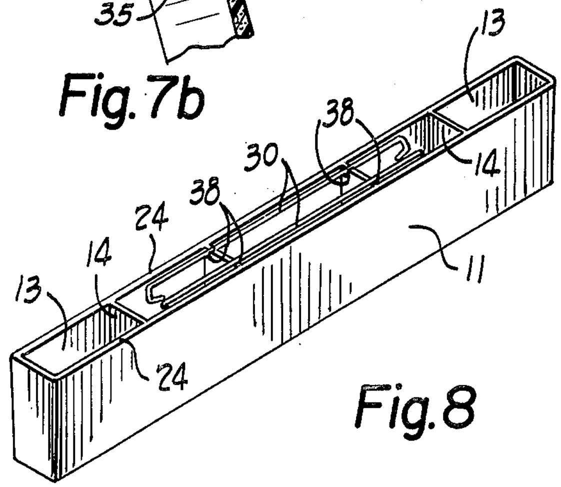
FIG. 8 is another view of the underside of the cross beam of FIG. 2 showing the braces in their storage portion.

To provide convenient and compact storage for the braces 30 when the sawhorse is knocked down, grooves 38 are provided in the partitions 14 of the cross beam 11. As shown in FIG. 8, the braces have a friction fit in the grooves 38 so that the braces can be stored longitudinally along the underside of the beam.

Assembly of the sawhorse of the present invention is fast and easy. The cross beam 11 is turned upside down so that the recesses 13 face upward. A pair of legs 12 are held together so that the vertical surfaces 18 of the upper portions 16 are flush against each other. The pair of legs 12 is then inserted into one of the recesses 13. Since the width of the upper portions 16 is relatively narrow at the upper end surface 20, the combined portions 16 of the pair of legs are easily guided into the mouth of the recess 13. As the portions 16 are inserted further into the recess 13, the fit becomes tighter. After both pair of legs (or as many pairs as desired) have been attached to the cross beam 11 in this manner, the entire sawhorse is turned over to its normal position. By applying additional weight to the cross beam 11, the upper portions 16 of the legs 12 are forced into the recesses 13, providing a tighter, more secure attachment. The movement of the upper portions 16 into the recesses 13, is finally restrained when the underside 24 of the beam bears against the ledges 22. The sawhorse can be assembled thusly in a matter of seconds. The sawhorse also can be quickly and easily knocked down by turning the sawhorse upside down and pulling up on the legs 12. As the tight fit of the portions 16 in the recess 13 is loosened, the legs can be easily removed.

In order to provide a sawhorse of the construction just described which is light yet strong enough to support heavy loads, the sawhorse is constructed from a plastic material. Structural foam thermoplastics are the preferred material for the sawhorse of the present invention since they have a relatively low specific gravity, yet are able to withstand substantial compressive and tensile forces. As used herein, a structural foam thermoplastic material is defined as a material comprising a combination of thermoplastic resins and any conventional blowing or foaming agent which can be molded using any conventional plastic injection molding process to produce a rigid plastic part of the desired configuration which has a relatively low specific gravity. For the sawhorse to be sufficiently light and portable, the structural foam thermoplastic material should have an overall specific gravity of between 0.65 and 0.95. To support heavy loads comparable to a similarly dimensioned wood sawhorse, the structural foam thermoplastic should be able to withstand a compressive or tensile stress of at least 1,000 psi, and have a flexural modulus of at least 7,500 psi.

Other important properties to consider in choosing a suitable structural foam thermoplastic material are a solid integral skin with a cellular core to provide a durable and attractive outer surface, the ability to withstand environmental elements such as moisture and a range of temperatures which would normally cause deterioration to wood or metal materials, and the ability to withstand impacts such as hammer blows without fracture.

Suitable structural foam thermoplastics which contain the desired properties include those made of the following resins: polypropylene, polyethylene, polyvinyl chloride, nylon, and related copolymeric resins.

Structural foam polypropylene is the preferred thermoplastic material. Foam polypropylene can be injection molded into irregular shapes using any conventional injection molding technique with chemical or gaseous blowing agents. A major advantage of polypropylene in molding structural foam material is that it can produce the lowest density of any of the high stiffness structural resins. It is also heat resistant and tough at low temperatures. Foam polypropylene forms a solid integral skin with a cellular core. High density polypropylene foam has a typical specific gravity of 0.68 to 0.72. It also has a typical compressive strength of 1,400 to 1,600 psi, a typical tensile strength of 1,800 to 2,000 psi, and a flexural modulus of 95,000 to 105,000 psi. Suitable foam polypropylene materials are currently available under the commercial designations of Exxon 805 HC made by Exxon Chemical Company, Eastman 4E31A, made by Eastman Chemical Products, Inc., Amoco 10-6317 made by Amoco Chemicals Corporation, and Shell 7625 made by Shell Chemical Company.

Another suitable material is structural foam polyethylene. Either high or low density polyethylene resin may be used. High density foam polyethylene, for instance, has a typical specific gravity of between 0.72 and 0.77, a compressive strength of around 1,300 psi, a tensile strength of around 1,300 psi, and a flexural modulus of around 100,000 to 120,000 psi. Foam polyethylene can also be injection molded into irregular shapes with a solid integral skin.

Various foam vinyls can be used, such as rigid cellular polyvinyl chloride. Rigid cellular vinyl has properties very close to those of wood and may be injection molded into desirable shapes. A typical specific gravity of rigid cellular polyvinyl chloride is about 0.9, a typical compressive strength is 4,000 to 5,000 psi, a typical tensile strength is also 4,000 to 5,000 psi, and a typical flexural modulus is 200,000 to 250,000 psi.

Nylons may also be foamed and molded. Nylon is particularly resistant to environmental wear and corrosion. A specific gravity of 0.75 to 0.86, with a compressive strength of 7,000 to 9,000 psi, a tensile strength of 7,000 to 9,000 psi, and a flexural modulus of 200,000 to 250,000 psi, is possible with foam nylon.

By the proper selection of a suitable thermoplastic material for the sawhorse structure, a sawhorse can be built having load bearing characteristics similar to wood and metal yet without the disadvantages of wood or metal. The plastic material will not rot, splinter, or warp like wood, or rust or corrode like metal, and it requires no additional protective coating. Reflective tape or other reflective devices can be easily applied to the exterior plastic surfaces if the sawhorses are to be used as barricades or the like. In addition, the wedge-type construction of the present invention can be more advantageously utilized with plastic material than with wood or metal. A similar sawhorse construction using metal would not be resilient enough to provide the necessary friction holding ability when the upper portions 16 of the legs are jammed into the recesses 13 of the cross beam 11. While wood may provide the proper resilience, it may have a tendency to split in the area of the tight wedge fit. Plastic material is less likely to split under these conditions than wood.

The result is a sawhorse structure in which the legs do not become easily disengaged from the beam if the sawhorse is picked up and moved about. The jam fit of the wedge legs into the recesses holds fast without additional bolts, screws or clamps.

EXAMPLE

A sawhorse has been injection molded with a commercially available foamed copolymer polypropylene material. The cross beam has a length of 23 in. and a cross section of approximately 2 in. by 4 in. Five recesses are provided in the underside of the cross beam. The cross beam shell is one-fourth in. thick and each partition is one-fourth in. thick. The partitions are spaced about 4 in. apart. Each leg has an overall length of 28-½ in. When assembled, the lower portion of each leg extends at an angle of about 16° to vertical and has a cross section of 1-¼ by 4 in. The lower leg shell and diagonal struts measure one-fourth in. thick. The width of the upper leg portion 16 is about 4 in., and the thickness tapers from about ¾ in. to about ⅝ in to form the wedge-shape. The braces are three-sixteenths in. diameter steel rods.

When assembled, the sawhorse stands 28 in. high and 23 in. long. The overall spread of each pair of legs at the floor is 15 in. A pair of these sawhorses have supported a test load of 8,000 lbs.

The sawhorse can be knocked down to and stored in a space measuring only 4 in. by 8 in. by 28-½ in. The weight of the sawhorse is only 9 lbs.

While the preferred form of this invention has been specifically illustrated and described therein, it will be apparent to those skilled in the art that modifications and improvements may be made to the form herein specifically disclosed. Accordingly, the present invention is not to be limited to the form therein specifically disclosed nor in any other way inconsistent with the progress in the art promoted by this invention.

I claim:

1. A sawhorse comprising a horizontal, hollow cross beam open at the underside thereof having a plurality of spaced laterally-extending partitions which define a plurality of rectangular-shaped vertical recesses; and at least two pairs of hollow legs, each leg having a wedge-shaped upper portion with a flat vertical side and a flat, non-parallel, angled side, the width of said vertical side and said angled side being essentially the same as the spacing between said partitions, said vertical sides being hollow and provided with a vertical integrally-formed reinforcing strut forming a bearing surface thereon, each leg also having a lower portion extending at an obtuse angle from said upper portion, said lower portion also being hollow from its inner side and provided with a plurality of integrally-formed diagonal reinforcing struts, each pair of legs being removably secured to said beam by juxtaposing said vertical sides of said pair of legs and inserting said upper ends of said pair of legs together into one of said recesses, the maximum thickness of said juxtaposed pair of upper ends being slightly greater than the corresponding interior width of the recess, whereby said upper portions form a wedging engagement with said recess; said cross beam and said legs formed of structural foam polypropylene having a specific gravity of between 0.68 and 0.72, a compressive strength of between 1,400 and 1,600 psi, a tensile strength of between 1,800 and 2,000 psi, and a flexural modulus of 95,000 to 105,000 psi.

2. A sawhorse according to claim 1 comprising in addition at least two horizontal braces, each brace extending between said lower portions of a pair of legs and removably hooked at each end around one of said diagonal struts in said lower portion.

* * * * *

UNITED STATES PATENT AND TRADEMARK OFFICE

CERTIFICATE OF CORRECTION

PATENT NO. : 4,014,405

DATED : March 29, 1977

INVENTOR(S) : John H. Breisch

It is certified that error appears in the above-identified patent and that said Letters Patent are hereby corrected as shown below:

In the Abstract, line 13, change "vertical" to --horizontal--.
Column 1, line 12, change "platfold" to --platform--.
Column 4, line 15, after "braces" insert --30--.

Signed and Sealed this

Twenty-first Day of June 1977

[SEAL]

*Attest:*

RUTH C. MASON
*Attesting Officer*

C. MARSHALL DANN
*Commissioner of Patents and Trademarks*